Oct. 30, 1962 C. G. BYRD ET AL 3,061,795

FLIP-FLOP VARIES FREQUENCY OF BLOCKING OSCILLATOR

Filed Jan. 22, 1958

Inventors:
Clarence G. Byrd,
William K. Hagan,
by Gust & Irish
Attorneys.

United States Patent Office 3,061,795

Patented Oct. 30, 1962

3,061,795

FLIP-FLOP VARIES FREQUENCY OF BLOCKING OSCILLATOR

Clarence G. Byrd and William K. Hagan, Fort Wayne, Ind., assignors to International Telephone & Telegraph Corporation Filed Jan. 22, 1958, Ser. No. 710,584
11 Claims. (Cl. 331—52)

This invention relates to circuits for indicating the presence of a radio signal, and more particularly to a circuit for indicating the presence of a pulsed radio signal, the indication being sustained for a period of time longer than an individual signal pulse.

There are instances where it is desirable to provide an indication of the presence of a pulsed radio signal, the individual pulses being of very short duration and it may further be desirable that such indication be humanly perceptible, i.e., orally, visually, or by the sense of touch. Since the radio pulses desired to be detected are of extremely short duration, it is thus additionally desirable that the indication responsive to the presence of such a signal be of substantially longer duration than the duration of an individual signal pulse. It may also be desirable to provide a different humanly perceptible indication of the absence of the pulsed radio signal.

In accordance with the broader aspects of our invention, therefore, we provide an input circuit adapted to receive the input signal with bistable means coupled to the input circuit and having first and second stable conditions respectively providing first and second output signals. The bistable means is arranged to be switched from its first to its second stable condition responsive to the presence of the input signal in the input circuit and first oscillator means is provided coupled to the bistable means and arranged to oscillate responsive to the second output signal from the bistable means and to be disabled from oscillation responsive to the first output signal from the bistable means. The first oscillator means is arranged so that the period of its output signal is greater than twice the duration of the input signal and the output circuit of the first oscillator means is coupled to the bistable means with the bistable means being arranged to be switched from its second to its first stable condition responsive to the second half-cycle of the output signal of the first oscillator means so that the second output signal of the bistable means has a duration of one-half the period of the first oscillator means. Second oscillator means is provided coupled to the bistable means and arranged to oscillate responsive to the second output signal thereof to provide an output signal having a frequency higher than the frequency of the first oscillator means and to be disabled from oscillating at such higher frequency, responsive to the first output signal from the bistable means. In a specific embodiment of the invention, the second oscillator means oscillates at a second frequency lower than its first frequency responsive to the first output signal from the bistable means. The second oscillator means has an output circuit adapted to be connected to indicating means which provides an indication of the higher frequency output signal of the second oscillator means, which will have a duration of half the period of oscillation of first oscillator means and thus greater than the duration of the input signal; in the above-mentioned specific embodiment, the indicating means will also provide an indication of the second lower frequency output signal of the second oscillator means.

It is therefore an object of this invention to provide an improved circuit for indicating the presence of a radio signal.

Another object of this invention is to provide an improved circuit for indicating the presence of a pulsed radio signal.

A further object of this invention is to provide an improved circuit for providing a humanly perceptible indication of the presence of a pulsed radio signal.

Yet another object of this invention is to provide an improved circuit for providing a humanly perceptible indication of both the presence and absence of a pulsed radio signal.

A still further object of this invention is to provide an improved circuit for providing a humanly perceptible indication of the presence of a pulsed radio signal, with the duration of the indication being longer than the duration of individual signal pulses.

The above mentioned and other features and objects of this invention and the manner of attaining them will become more apparent and the invention itself will be best understood by reference to the following description of an embodiment of the invention taken in conjunction with the accompanying drawings, wherein.

Figure 1:
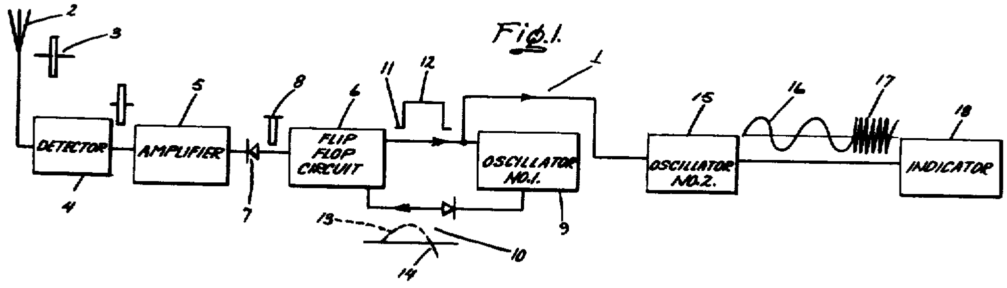
FIG. 1 is a block diagram schematically showing our invention.

Referring now to FIG. 1 of the drawing, our improved pulsed radio signal indicating circuit, generally identified as 1, includes suitable antenna means 2 adapted to receive a pulsed radio signal 3. The antenna 2 is coupled to a conventional detector means 4 for detecting the high frequency input signal 3, the detector means 4 being coupled to conventional amplifier means 5. In accordance with our invention, we provide a flip-flop circuit 6, to be hereinafter more fully described, having its input circuit coupled to the output circuit of amplifier 5 by a diode 7 so that the input signal pulse applied to the flip-flop circuit 6 has either one polarity or the other; the input pulse 8 applied to flip-flop circuit 6 is shown here as being a negative-going pulse. Flip-flop circuit 6 has its output circuit coupled to the signal input circuit of the first oscillator 9. It will be understood that oscillator 9 is of the type which provides an output signal only responsive to an input signal having a predetermined voltage level and in the absence of such a predetermined voltage level input signal, the oscillator is disabled from oscillation. As will be hereinafter more fully described, oscillator 9 has its output circuit coupled to the flip-flop circuit 6 by a suitable diode 10.

The flip-flop circuit 6 has two stable conditions respectively providing two different output signals and is arranged to be switched from its first stable condition to its second stable condition responsive to the presence of input signal pulse 8 in the input circuit of the flip-flop circuit 6; in its first stable condition, flip-flop circuit 6 provides a lower output voltage level 11 and in its second stable position the flip-flop circuit 6 provides an upper voltage level 12. Oscillator 9 is arranged to be disabled from oscillation when the lower output voltage level 11 from flip-flop circuit 6 is applied thereto and to oscillate responsive to application of the upper output voltage 12. Oscillator 9 is arranged to oscillate at a very low frequency having a period substantially more than twice the duration of the input signal pulses 8 applied to the flip-flop circuit 6. The diode 10 is polarized in a direction to block the first half-cycle 13 of the output signal of the oscillator 9 and thus to pass the second half-cycle 14 to the flip-flop circuit 6. Flip-flop circuit 6 is further arranged to be switched from its second stable position back to its first stable position responsive to the application of the second half-cycle 14 of the oscillator 9 thereto; as soon as the polarity of the output signal of the oscillator 9 reverses, as at 14, that reversed polarity signal is applied by the diode 10 to the flip-flop circuit 6 and causes the flip-flop circuit 6 to switch back to its first stable position to provide the lower output voltage level 11 and thus disable the oscillator 9 from further oscillation. It is thus seen that the duration of the upper output voltage level 12 from the flip-flop circuit 6 corresponds to half the period of oscillation of the oscillator 9 and that the duration of this upper voltage level 12 is substantially greater than the duration of the input signal pulse 8.

The output circuit of the flip-flop circuit 6 is also connected to the signal input circuit of the second blocking oscillator 15. Oscillator 15 is arranged to provide a first output signal 16 having a very low frequency responsive to application of the lower output voltage level 11 from the flip-flop circuit 6 and to oscillate at a higher frequency 17 responsive to application of the upper output voltage level 12 of the flip-flop circuit 6; oscillator 15 may in practice be arranged to provide its normal output signal frequency 17 responsive to the upper output voltage level 12 of the flip-flop circuit 6 and merely to "motorboat" to provide the lower frequency output signal 16 responsive to the lower output voltage level 11 from the flip-flop circuit 6. The output circuit of the oscillator 15 is coupled to a suitable indicating means 18 which will provide an indication of both the lower frequency output signal and the higher frequency output signal 17 from the oscillator 15. It will now be understood that oscillator 15 will provide its lower frequency output signal 16 at all times when an input signal 3 is not being received by the antenna 2, and will provide its higher frequency output signal 17 in response to the incidence of each input signal pulse 3 on the antenna 2, the duration of the higher frequency output signal 17 corresponding to the duration of the upper output voltage level 12 of flip-flop circuit 6 and thus to half the period of the first oscillator 9.

Figure 2:
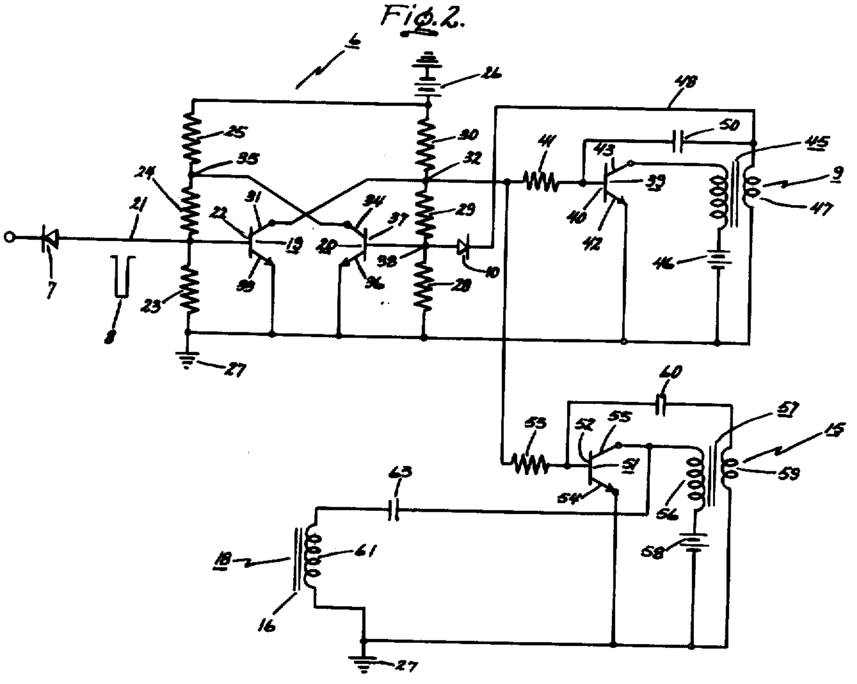
FIG. 2 is a schematic circuit diagram more specifically illustrating our invention.

Referring now to FIG. 2, the preferred circuitry of the flip-flop or multivibrator circuit 6, first oscillator 9 and second oscillator 15 will be described in detail. Here, flip-flop circuit 6 includes two transistors 19 and 20, shown here as being of the NPN-type. An input circuit 21 is provided having diode 7 connected therein, it being understood that diode 7 is adapted to be connected to amplifier 5 and is shown here as being polarized to provide a negative-going signal input pulse 8. The input circuit 21 is shown as being directly connected to the base 22 of the first transistor 19, the normal base bias voltage being provided by resistors 23, 24 and 25 serially connected between the positive side of a suitable source of direct current potential, shown here as being battery 26, and ground 27. Another voltage divider comprised of serially connected resistors 28, 29 and 30 is provided connected between the positive side of battery 26 and ground 27, and the collector 31 of transistor 19 is connected to point 32 between resistors 29 and 30 with the emitter 33 of transistor 19 being connected to ground 27 as shown. The collector 34 of the other transistor 20 is connected to point 35 between resistors 24 and 25 and its emitter 36 is likewise connected to ground 27 as shown. The base 37 of the other transistor 20 is connected to point 38 between resistors 28 and 29 as shown.

In the arrangement of the flip-flop circuit 6 as shown in FIG. 2, when no signal input pulse 8 is present in the input circuit 21, the base 22 of the first transistor 19 is biased to turn the transistor 19 on so that current flows from the positive side of battery 26 through resistor 30 and the transistor 19 to ground, thus essentially short-circuiting the resistors 28 and 29 and biasing the base 37 of the other transistor 20 so that it is turned off. With this arrangement, the point 32 to which the collector 31 of transistor 19 is connected is essentially at ground potential and thus the lower output voltage level 11 of FIG. 1 is developed between point 32 and ground 27. When, however, a signal input pulse 8 appears in the input circuit 21, the potential of the base 22 of the transistor 19 is lowered sufficiently to cut-off transistor 19 thus removing the short-circuit across the resistors 28 and 29. This causes the potential of point 38 to be raised and thus correspondingly raising the potential to base 37 of transistor 20 to turn on transistor 20. Turning off the transistor 19 likewise raises the potential of point 32 thus providing the second upper output voltage level 12 of FIG. 1 between point 32 and ground 27.

The first oscillator 9 includes a transistor 39 having its base 40 connected to output point 32 in flip-flop circuit 6 by a biasing resistor 41. The emitter 42 of the transistor 39 is connected to ground 27 as shown and the collector 43 is serially connected with primary winding 44 of output transformer 45 and a source of positive direct current potential, shown here as battery 46. The secondary winding 47 of the transformer 45 is connected to point 38 of the flip-flop circuit 6 by a conductor 48 and diode 10, and the feedback connection between the secondary winding 47 and the base 40 of transistor 39 to provide oscillation is effected by capacitor 50.

As explained above in connection with FIG. 1, the first oscillator 9 is arranged to provide an output signal having a very low frequency and thus a period considerably more than twice as long as the duration of the signal input pulse 8 responsive to application of the upper output voltage level pulse 12 from the flip-flop circuit 6. First oscillator 9 is further arranged to be disabled from oscillation responsive to the lower output voltage level 11 from flip-flop circuit 6, resistor 41 and capacitor 50 having their values suitably chosen to provide the blocking action and the desired output signal frequency. It will further be seen that the diode 10 is polarized in a direction to block the first positive half-cycle 13 in the output signal of the first oscillator 9 and to pass the first negative half-cycle 14. The polarity reversal of the output signal of the oscillator 9 applied to the base 37 of transistor 20 cuts-off transistor 20, thus removing what is essentially a short-circuit across resistors 23 and 24, and thus, assuming that no input pulse 8 is present in the input circuit 21, transistor 19 will immediately be turned on essentially producing a short-circuit across resistors 28 and 29 and lowering the potential of point 32 to the lower voltage level 11, thus terminating the oscillation of the first oscillator 9.

The second oscillator 15 also has a transistor 51 having its base 52 likewise connected to point 32 on flip-flop circuit 6 by a resistance 53. Emitter 54 of the transistor 51 is connected to ground 27, as shown, and the collector 55 is connected in series with primary winding 56 of transformer 57 and the positive side of a suitable source of potential, shown here as being battery 58. The secondary winding 59 of the transformer 57 is connected between base 52 of transformer 51 and ground 27 by feedback capacitor 60, as shown. Oscillator 15 is arranged by suitable choice of resistance 53 and capacitor 60 to provide an output signal 17 having a frequency considerably higher than the frequency of the output signal of the first oscillator 9 responsive to application of the upper output voltage level 12 from the flip-flop circuit 6 on the base 52 of transistor 51. It is thus seen that the duration of the output signal 17 provided by the second oscillator 15 is the same as the duration of the upper voltage level 12 provided by flip-flop circuit 6 and thus one-half the period of the oscillation of the first oscillator 9. Oscillator 15 is additionally arranged to provide another output signal 16 having a frequency much lower than the output signal 17 responsive to the application of the lower level output voltage 11 from the flip-flop circuit 6; conventionally oscillator 15 is arranged to "motorboat" or to provide a low frequency parasitic oscillation responsive to its $I_{co}$ current when the lower level output voltage 11 is supplied to the base 52 of transistor 51.

In order to provide an indication of the absence or presence of the pulse 3 in the antenna 2 of the circuit of FIG. 1, the indicating device 18 includes a suitable coil 61 disposed on a laminated core 62 with the coil 61 being serially connected with a blocking capacitor 63 between the collector 55 of transistor 51 and ground 27. The coil and core 61, 62 of indicating device 18 may be arranged to actuate an audible signal to provide a visual indication, or even to provide a response sensitive to the touch. It will now be seen that the second oscillator 15 will provide a standby low frequency pulsing tone when no signal pulse is present in the input of the circuit and on the reception of an input signal pulse will indicate the presence of the pulse by a steady tone of a higher frequency than the standby tone, which higher frequency tone persists for a period of time equal to half the natural period of oscillation of the first oscillator 9.

In an actual circuit constructed in accordance with FIG. 2 of our invention, the following circuit elements were employed:

| | | |
|---|---|---|
| Diode **7** | | 1N69 |
| Resistor **23** | ohms | 15,000 |
| Resistor **24** | do | 68,000 |
| Resistor **25** | do | 89,000 |
| Batteries **26, 46** and **58** | volts | 22.5 |
| Transistors **19** and **20** | | 2517 |
| Resistor **28** | ohms | 12,000 |
| Resistor **29** | do | 75 000 |
| Resistor **30** | do | 15,000 |
| Resistor **41** | megohms | 1.2 |
| Resistor **53** | ohms | 12,000 |
| Diode **10** | | 1N69 |
| Transistors **39** and **51** | | 2517 |
| Capacitor **50** | microfarads | 5 |
| Capacitor **60** | do | 10 |
| Capacitor **63** | do | 10 |

With the above circuit constants, oscillator 9 had a natural period of three seconds, and thus the duration of upper voltage level 12 and output signal 17 from the second oscillator 15 was 1.5 seconds as compared with an input pulse having a duration of one (1) microsecond; it was found that the flip-flop circuit 6 would trigger responsive to a negative-going pulse 8 of one-hundred (100) microvolts. With this arrangement, the frequency of the output signal 16 of the second oscillator 15 when no input signal was applied to the flip-flop circuit 6 was three (3) cycles per second, this low oscillation being caused by the $I_{co}$ of the transistor 51, and the frequency of the output signal 17 was two-hundred (200) cycles per second.

It will now be readily seen that we have provided a circuit which on the reception of a single short input pulse will provide an indication of the presence of the input signal which persists for a sufficient length of time to permit of human perception, the circuit also providing a standby signal to indicate the absence of an input signal, thus to assure the operator that the equipment is in fact operative. This time delay, which may be well over a second, is provided with low impedance transistor devices and the output can be utilized to provide oral, visual, or a sense of touch indication; the employment of transistors and the simplicity of the circuit permits the circuit to be assembled in an extremely small and light weight package.

While we have described above the principles of our invention in connection with specific apparatus, it is to be clearly understood that this description is made only by way of example and not as a limitation to the scope of our invention.

What is claimed is:

1. A circuit for indicating the presence of a radio signal comprising: an input circuit adapted to receive an input signal; bistable means coupled to said input circuit and having first and second stable conditions respectively providing first and second output signals, said bistable means being arranged to be switched from said first to said second stable condition responsive to the presence of said input signal in said input circuit; first oscillator means coupled to said bistable means and arranged to oscillate responsive to said second output signal thereof and to be disabled responsive to said first output signal thereof, said first oscillator means having an output circuit coupled to said bistable means, said bistable means being arranged to be switched from said second to said first stable condition responsive to a predetermined polarity reversal of the output signal of said first oscillator means; and second oscillator means coupled to said bistable means and arranged to oscillate responsive to said second output signal thereof, said second oscillator means having an output circuit adapted to be connected to indicating means.

2. A circuit for indicating the presence of a radio signal comprising: an input circuit adapted to receive an input signal; a flip-flop circuit connected to said input circuit and having an output circuit, said flip-flop circuit having first and second stable conditions respectively providing first and second output signal levels, said flip-flop circuit being arranged to be switched from said first to said second stable condition responsive to the presence of said input signal in said input circuit; a first oscillator having a signal input circuit connected to said output circuit of said flip-flop circuit and being arranged to oscillate responsive to said flip-flop circuit second output signal level and to be blocked responsive to said flip-flop circuit first output signal level, said first oscillator having an output circuit connected to said flip-flop circuit, said flip-flop circuit being arranged to be switched from said second to said first stable condition responsive to the first polarity reversal of the output signal of said first oscillator; and a second oscillator having a signal input circuit connected to said output circuit of said flip-flop circuit and arranged to oscillate responsive to said flip-flop circuit second output signal level, said second oscillator having an output circuit adapted to be connected to indicating means.

3. A circuit for indicating the presence of a pulsed radio signal comprising: an input circuit adapted to receive short input signal pulses; bistable means coupled to said input circuit and having first and second stable conditions respectively providing first and second output signals, said bistable means being arranged to be switched from said first to said second stable condition responsive to the presence of a said input signal pulse in said input circuit; first oscillator means coupled to said bistable means and arranged to oscillate with a period more than twice the duration of each said input pulse responsive to said bistable means output signal and to be disabled responsive to said first output signal thereof, said first oscillator means having an output circuit coupled to said bistable means, said bistable means being arranged to be switched from said second to said first stable condition responsive to the second half-cycle of the output signal of said first oscillator means whereby said bistable means second output signal has a duration equal to half the period of said first oscillator means; and second oscillator means coupled to said bistable means and arranged to oscillate responsive to said second output signal thereof, said second oscillator means having an output circuit adapted to be connected to indicating means.

4. A circuit for indicating the presence of a pulsed radio signal comprising: an input circuit adapted to receive short input signal pulses; bistable means coupled to said input circuit and having first and second stable conditions respectively providing first and second output signals, said bistable means being arranged to be switched from said first to said second stable conditions responsive to the presence of a said input signal pulse in said input circuit; first oscillator means coupled to said bistable means and arranged to oscillate with a period more than twice the duration of each said input pulse responsive to said bistable means second output signal and to be disabled responsive to said bistable means first output signal, said first oscillator means having an output circuit coupled to said bistable means, said bistable means being arranged to be switched from said second to said first stable condition responsive to the second half-cycle of the output signal of said first oscillator means whereby said bistable means second output signal has a duration equal to half the period of said first oscillator means; and second oscillator means coupled to said bistable means and arranged to oscillate with a frequency higher than the frequency of said first oscillator means responsive to said bistable means second output signal whereby the output signal of said second oscillator means has a duration equal to one-half the period of the output signal of said first oscillator means, said second oscillator means having an output circuit adapted to be connected to indicating means.

5. A circuit for indicating the presence of a pulsed radio signal comprising: an input circuit adapted to receive short input signal pulses; bistable means coupled to said input circuit and having first and second stable conditions respectively providing first and second output signals, said bistable means being arranged to be switched from said first to said second stable conditions responsive to the presence of a said input signal pulse in said input circuit; first oscillator means coupled to said bistable means and arranged to oscillate with a period more than twice the duration of each said input pulse responsive to said bistable means second output signal and to be disabled responsive to said bistable means first output signal, said first oscillator means having an output circuit coupled to said bistable means, said bistable means being arranged to be switched from said second to said first stable condition responsive to the second half-cycle of the output signal of said first oscillator means whereby said bistable means second output signal has a duration equal to half the period of said first oscillator means; and second oscillator means coupled to said bistable means and arranged to oscillate with a first frequency higher than the frequency of said first oscillator means responsive to said bistable means second output signal and to oscillate at a second frequency lower than said first frequency responsive to said bistable means first output signal whereby the output signal of said second oscillator means at said first frequency has a duration equal to one-half the period of the output signal of said first oscillator means, said second oscillator means having an output circuit adapted to be connected to indicating means.

6. A circuit for indicating the presence of a pulsed radio signal comprising: an input circuit adapted to receive short input signal pulses: bistable means coupled to said input circuit and having first and second stable conditions respectively providing first and second output signals, said bistable means being arranged to be switched from said first to said second stable condition responsive to the presence of a said input signal pulse in said input circuit; first oscillator means coupled to said bistable means and arranged to oscillate with a period more than twice the duration of each said input pulse responsive to said bistable means second output signal and to be disabled responsive to said bistable means second output signal, said first oscillator means having an output circuit coupled to said bistable means, said bistable means being arranged to be switched from said second to said first stable condition responsive to the second half-cycle of the output signal of said first oscillator means whereby said bistable means second output signal has a duration equal to half the period of said first oscillator means; second oscillator means coupled to said bistable means and arranged to oscillate with a first frequency higher than the frequency of said first oscillator means responsive to said bistable means second output signal and to oscillate at a second frequency lower than said first frequency responsive to said bistable means first output signal whereby the output signal of said second oscillator means at said first frequency has a duration equal to one-half the period of the output signal of said first oscillator means, said second oscillator means having an output circuit; and indicating means coupled to said second oscillator means output circuit and arranged to provide a first indication responsive to said second oscillator means first frequency and a second indication responsive to said second oscillator means second frequency.

7. A circuit for indicating the presence of a pulsed radio signal comprising: an input circuit adapted to receive short input pulses having a predetermined polarity; a flip-flop circuit connected to said input circuit and having an output circuit, said flip-flop circuit having first and second stable conditions respectively providing first and second output signal levels, said flip-flop circuit being arranged to be switched from said first to said second stable conditions responsive to the presence of an input signal pulse in said input circuit; a first oscillator having a signal input circuit connected to said output circuit of said flip-flop circuit and being arranged to oscillate with a period more than twice the duration of an input signal pulse responsive to said second output signal level and to be blocked responsive to said first output signal level, said first oscillator having an output circuit; rectifier means connecting said first oscillator to said flip-flop circuit for passing the second half-cycle of the output signal of said first oscillator to said flip-flop circuit, said flip-flop circuit being arranged to be switched from said second to said first stable condition responsive to said second half-cycle of said first oscillator output signal whereby said second output signal level of said flip-flop circuit has a duration of one-half the period of said output signal of said first oscillator; a second oscillator having a signal input circuit connected to said output circuit of said flip-flop circuit and arranged to oscillate to provide an output signal with a frequency higher than the frequency of said first oscillator responsive to said flip-flop circuit second output signal level, said second oscillator having an output circuit; and means for providing a mechanical vibration connected to said second oscillator output circuit and excited in response to the output signal of said second oscillator.

8. A circuit for indicating the presence of a pulsed radio signal comprising: an input circuit adapted to receive short input pulses having a predetermined polarity; a flip-flop circuit connected to said input circuit and having an output circuit, said flip-flop circuit having first and second stable conditions respectively providing first and second output signal levels, said flip-flop circuit being arranged to be switched from said first to said second stable conditions responsive to the presence of an input signal pulse in said input circuit; a first oscillator having a signal input circuit connected to said output circuit of said flip-flop circuit and being arranged to oscillate with a period more than twice the duration of an input signal pulse responsive to said second output signal level and to be blocked responsive to said flip-flop circuit first output signal level, said first oscillator having an output circuit; diode means connecting said first oscillator to said flip-flop circuit and polarized to pass the second half-cycle of the output signal of said first oscillator to said flip-flop circuit, said flip-flop circuit being arranged to be switched from said second to said first stable condition responsive to said second half-cycle of said first oscillator output signal whereby said second output signal level of said flip-flop circuit has a duration of one-half the period of said output signal of said first oscillator; a second oscillator having a signal input circuit connected to said output circuit of said flip-flop circuit and arranged to oscillate to provide a first output signal with a first frequency higher than frequency of said first oscillator responsive to said flip-flop circuit second output signal level and to provide a second output signal with a second frequency lower than said first frequency responsive to said flip-flop circuit first output signal, said second oscillator having an output circuit; and means connected to said second blocking oscillator output circuit for providing mechanical vibration at two frequencies responsive respectively to said first and second output signals of said second blocking oscillator.

9. A circuit for indicating the presence of a pulsed radio signal comprising: an input circuit adapted to receive short input signal pulses; bistable means coupled to said input circuit and having first and second stable conditions respectively providing first and second output signals, said bistable means being arranged to be switched from said first to said second stable condition responsive to the presence of a said input signal pulse in said input circuit; first oscillator means coupled to said bistable means and arranged to oscillate with a period more than twice the duration of each said input pulse responsive to said bistable means second output signal and to be disabled responsive to said bistable means first output signal, said first oscillator means having an output circuit coupled to said bistable means, said bistable means being arranged to be switched from said second to said first stable condition responsive to the second half-cycle of the output signal of said first oscillator means whereby said bistable means second output signal has a duration equal to half the period of said first oscillator means; and second oscillator means coupled to said bistable means and arranged to oscillate with a first frequency higher than the frequency of said first oscillator means responsive to said bistable means second output signal and to oscillate at a second frequency lower than said first frequency responsive to said bistable means first output signal whereby the output signal of said second oscillator means at said first frequency has a duration equal to one-half the period of the output signal of said first oscillator means, said second oscillator means having an output circuit; and means coupled to said second oscillator means output circuit and arranged to provide a mechanical vibration at two frequencies responsive respectively to said first and second frequencies of said second oscillator means.

10. A circuit for indicating the presence of a pulsed radio signal comprising: a first oscillator circuit including valve means having a control element; an input circuit adapted to receive short signal input pulses having a predetermined polarity; a flip-flop circuit including a pair of valve means, one of said pair of valve means having a control element connected to said input circuit and an output element connected to said control element of said oscillator, the other of said pair of valve means having a control element and an output element connected in circuit respectively with the output and control elements of said one valve means, said flip-flop circuit having a first stable condition with said one valve means conducting and said other valve means non-conducting and thereby providing a first lower output voltage level applied to said first oscillator control element, said first oscillator being disabled from oscillation responsive to application of said first lower output voltage level to its control element, said flip-flop circuit having a second stable condition with said one valve means non-conducting and said other valve means conducting and thereby providing a second upper output voltage level applied to said first oscillator control element, said flip-flop circuit being caused to switch from said first to said second stable condition responsive to the presence of a signal input pulse in said input circuit, said first oscillator being caused to oscillate to provide an output signal with a period substantially greater than twice the duration of one of said signal input pulses responsive to application of said second voltage level to its control element, said first oscillator having an output circuit connected to the control element of said other valve means of said flip-flop circuit by a diode arranged to pass the second half-cycle of the output signal of said first oscillator, said flip-flop circuit being caused to switch from said second stable condition to said first stable condition responsive to application of said second half-cycle of said first oscillator output signal to said other valve means control element whereby said upper output voltage level has a duration of one-half the period of said first oscillator; a second oscillator circuit including valve means having a control element connected to said output element of said one valve means of said flip-flop circuit, said second oscillator being arranged to oscillate to provide a first output signal with a first lower frequency responsive to application of said lower output voltage level to the control element of its valve means and to oscillate to provide a second output signal with a second higher frequency responsive to application of said upper output voltage level to its valve means control element, said second oscillator having an output circuit; and mechanical vibrating means connected to said second oscillator output circuit and arranged to vibrate at a first frequency responsive to said first output signal thereof thereby to indicate the absence of a signal input pulse and to vibrate at a second frequency responsive to said second output signal thereof thereby to indicate the presence of a signal input pulse.

11. A circuit for indicating the presence of a pulsed radio signal comprising: a first oscillator circuit including a transistor having base, collector and emitter elements, an input circuit adapted to receive short signal input pulses having a predetermined polarity; a flip-flop circuit including a pair of transistors each having base, collector and emitter elements; one of said flip-flop circuit transistors having its base connected to said input circuit and having one of its collector and emitter elements connected to the base of said oscillator transistor, the other of said flip-flop circuit transistors having one of its collector and emitter elements connected in circuit with the base of said one transistor and having its base connected in circuit with said one element of said one transistor, said flip-flop circuit having a first stable condition with said one transistor conducting and said other transistor non-conducting thereby providing a first lower output voltage level applied to the base of said first oscillator transistor, said first oscillator being disabled from oscillation responsive to application of said first lower output voltage level to its transistor base, said flip-flop circuit having a second stable condition with said one transistor non-conducting and said other transistor conducting thereby providing a second upper output voltage level applied to said first oscillator transistor base, said flip-flop circuit being caused to switch from said first to said second stable condition responsive to the presence of a signal input pulse in said input circuit, said first oscillator being caused to oscillate to provide an output signal with a period substantially greater than twice the duration of one of said signal input pulses responsive to application of said second voltage level to its transistor base, said first oscillator having an output transformer with its primary winding coupled to the collector and emitter elements of its transistor and with its secondary winding connected to the base of said other flip-flop circuit transistor by a diode polarized to pass the second half-cycle of the output signal of said first oscillator, said flip-flop circuit being caused to switch from said second to said first stable condition responsive to application of said half-cycle of said first oscillator output signal to said other transistor base whereby said upper output voltage level has a duration of one-half of the period of said first oscillator; a second oscillator circuit including a transistor having base, collector and emitter elements with said base thereof connected to said one element of said one transistor of said flip-flop circuit; said second oscillator being arranged to oscillate to provide a first output signal with a first lower frequency responsive to application of said lower output voltage level to its transistor base and to oscillate to provide a second output signal with a second higher frequency responsive to application of said upper output voltage level to its transistor base; and mechanical vibratory means including a coil connected to one of said collector and emitter elements of said second oscillator transistor and arranged to vibrate at a first frequency responsive to said first output signal of said second oscillator thereby to indicate the absence of a signal input pulse and to vibrate at a second frequency responsive to said output signal of said second oscillator thereby to indicate the presence of a signal input pulse.

References Cited in the file of this patent

UNITED STATES PATENTS 2,428,058 Wise ------------------ Sept. 20, 1947

UNITED STATES PATENT OFFICE

CERTIFICATE OF CORRECTION

Patent No. 3,061,795 — October 30, 1962

Clarence G. Byrd et al.

It is hereby certified that error appears in the above numbered patent requiring correction and that the said Letters Patent should read as corrected below.

Column 8, line 75, and column 9, line 3, strike out "blocking", each occurrence.

Signed and sealed this 28th day of May 1963.

(SEAL)
Attest:

ERNEST W. SWIDER
Attesting Officer

DAVID L. LADD
Commissioner of Patents